United States Patent [19]

Mackey

[11] Patent Number: 4,500,754
[45] Date of Patent: Feb. 19, 1985

[54] SOLID STATE OFF HOOK PHONE LINE LOAD

[75] Inventor: Richard C. Mackey, Woodland Hills, Calif.

[73] Assignee: Novation, Inc., Chatsworth, Calif.

[21] Appl. No.: 225,310

[22] Filed: Jan. 15, 1981

[51] Int. Cl.$^3$ ...................... H04M 1/00; H04M 11/00
[52] U.S. Cl. .................................. 179/81 R; 179/2 C
[58] Field of Search .................. 179/81 R, 99 H, 2 C, 179/2 DP, 6.03, 6.16, 170 D, 170 T, 170 NC; 307/549, 315

[56] References Cited

U.S. PATENT DOCUMENTS

| 3,789,803 | 2/1974 | Davis et al. ...................... 179/81 R |
| 4,214,130 | 7/1980 | Questad ............................. 179/81 R |
| 4,243,844 | 1/1981 | Waldman ........................... 179/81 R |

FOREIGN PATENT DOCUMENTS

| 2446699 | 4/1976 | Fed. Rep. of Germany .... 179/81 R |
| 7706147 | 11/1978 | Sweden ............................. 179/81 R |
| 1591870 | 6/1981 | United Kingdom ............. 179/81 R |

OTHER PUBLICATIONS

"DC Current Bypass for a Line Transformer", by Braquet et al., *IBM Tech. Disclosure Bulletin*, vol. 23, No. 4, Sep. 1980, p. 1479.

Primary Examiner—Thomas W. Brown
Attorney, Agent, or Firm—Blakely, Sokoloff, Taylor & Zafman

[57] ABSTRACT

A direct connect telephone line interface which includes a solid state off hook phone line load is disclosed. The solid state off hook phone line load utilizes an active semiconductor device coupleable between the phone lines, with the control input to the active semiconductor device being coupled to a bias circuit operative from the voltage across the phone lines to bias the active semiconductor device in saturation as a result of an answer voltage on the phone lines. The bias circuit is frequency selective so that the bias point of the active semiconductor device is substantially independent of information signals on the telephone line. Thus the active semiconductor device, in combination with any impedance in series therewith to set the desired answer load on the telephone lines, provides the desired load impedance on the lines to maintain the connection, but at the same time provides a very high impedance to the AC signals (communication signals) on the line so as to not attenuate the communication signals subsequently coupled to an isolation transformer. This allows the reduction in the size of the isolation transformer normally used in such interfaces without requiring a separate, relatively large holding coil.

1 Claim, 1 Drawing Figure

SOLID STATE OFF HOOK PHONE LINE LOAD

BACKGROUND OF THE INVENTION

1. Field of the Invention

The present invention relates to the field of telephone line interface equipment, and more specifically to direct connect interface equipment.

2. Prior Art

Standard telephones operate on a two-conductor line (i.e., signal and return lines, though neither is necessarily at ground potential) through which all the signals required for dialing, ringing, answering and communication, and hang up are transmitted. Generally speaking, the ring signal is comprised of a DC voltage on the order of 50 volts, with AC ring signals impressed thereon of approximately 20 Hz to provide an overall signal on the order of 70 volts RMS. When the receiver goes "off hook", whether by manual pick-up of the receiver or by automatic answering equipment, an impedance of a few hundred ohms is imposed across the line by the receiver. The step-up in line current is detected at the central office after which time the ring signal is terminated, with the line connections being maintained by the central office until one of the parties hangs up as indicated by the removal of the load from the line of the calling or called party. For outgoing calls, the central office senses a receiver going off hook by an imposition of a load on the respective line and, noting that the off hook condition was not preceded by a prior connection as it would be for an incoming call, imposes a dial tone on the line to signal the caller to proceed with the dialing sequence.

An off-hook condition is generally recognized at the central office by the detection of a line current on the order of 20 ma or more, thereby requiring the imposition of a load on the line at the receiver on the order of a few hundred ohms. If simple resistive loads were used, the loads would also load down the information signals superimposed on the DC signal so as to grossly attenuate the AC signal component containing the information being communicated. Accordingly, in automatic phone answering equipment, it has been common practice to utilize an isolation transformer having a primary resistance on the order of 200 ohms and being of sufficient size so as to not substantially saturate due to the DC current therethrough (and of course the AC component riding thereon representing the information being transmitted or received). The primary of the transformer provides the desired DC load on the line though the inductance of the primary provides a relatively high impedance for the frequencies of the information on the line so as to not substantially attenuate these signals. Thus a transformer of a suitable size and design will provide the desired DC load to hold the line connection but will not substantially attenuate the information signals, and at the same time will provide the required DC isolation between the line and the answering equipment.

The DC current in the primary of the transformer coupled across the line will tend to saturate the iron in the transformer if the transformer is not of sufficient size and design. Thus, as an alternative in the prior art, a simple inductance having the appropriate DC resistance is coupled across the line, the inductance of course being designed to also not substantially saturate due to the DC current therethrough. This inductance, commonly referred to as a holding coil, will hold the line connection, with the signals being picked up from the line by an isolation transformer having the primary thereof capacitively coupled to the line. The capacitive coupling of the isolation transformer eliminates the DC component from the transformer primary, allowing a much smaller and less expensive transformer to be used. The advantage of the smaller isolation transformer is substantially diminished however, because of the required size of the holding coil to achieve the desired purpose.

BRIEF SUMMARY OF THE INVENTION

A direct connect telephone line interface which includes a solid-state holding coil is disclosed. The solid state off hook phone line load utilizes an active semiconductor device coupleable between the phone lines, with the control input to the active semiconductor device being coupled to a bias circuit operative from the voltage across the phone lines to bias the active semiconductor device in saturation as a result of an answer voltage on the phone lines. The bias circuit is frequency selective so that the bias point of the active semiconductor device is substantially independent of information signals on the telephone line. Thus the active semiconductor device, in combination with any impedance in series therewith to set the desired answer load on the telephone lines, provides the desired load impedance on the lines to maintain the connection, but at the same time provides a very high impedance to the AC signals (communication signals) on the line so as to not attenuate the communication signals subsequently coupled to an isolation transformer. This allows the reduction in the size of the isolation transformer normally used in such interfaces without requiring a separate, relatively large holding coil.

DETAILED DESCRIPTION OF THE INVENTION

Figure 1:
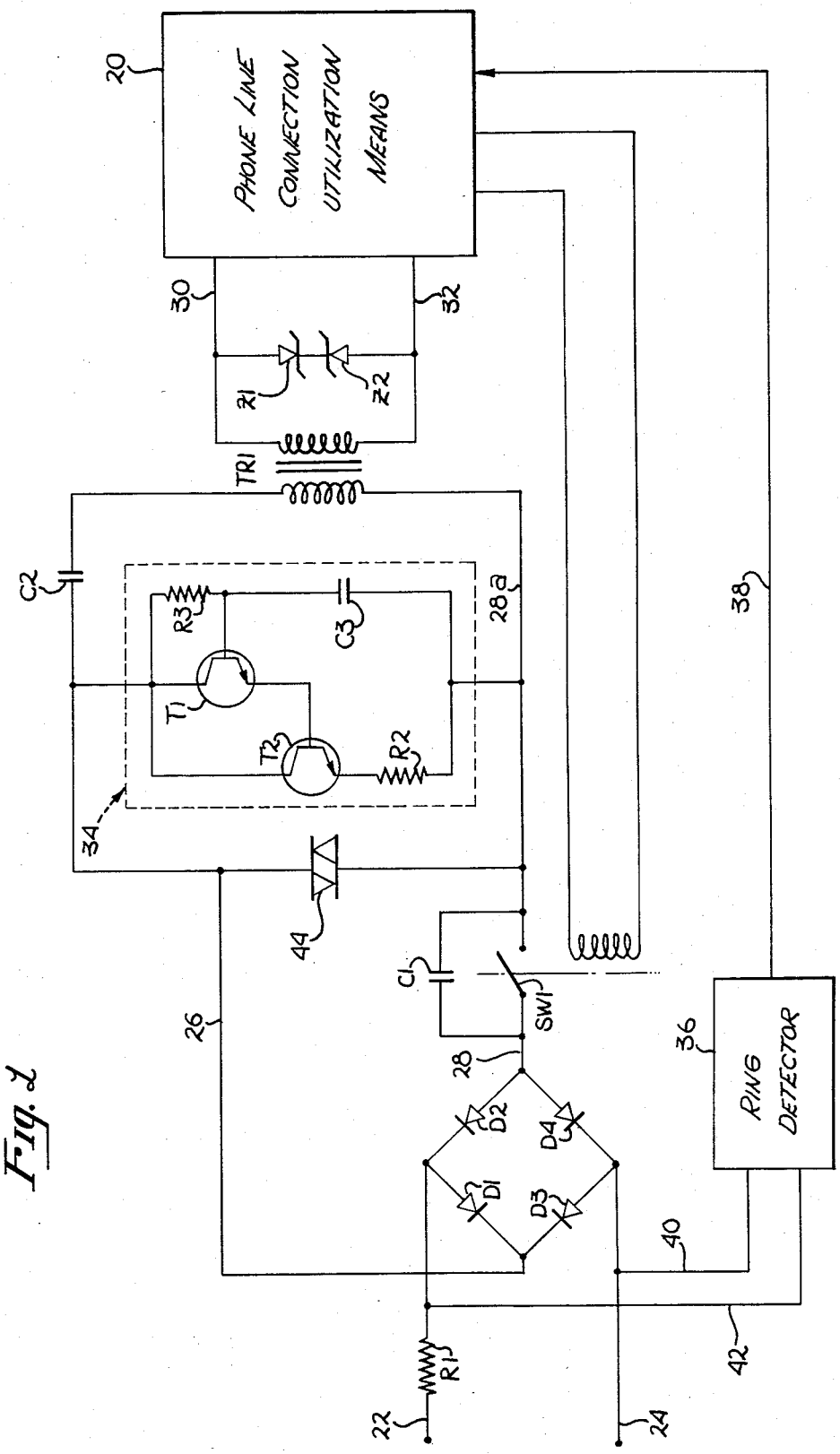
FIG. 1 is a current diagram of the preferred embodiment of the present invention.

Now referring to FIG. 1, a schematic diagram of the present invention phone line interface utilizing the new and unique solid state off hook phone line load may be seen. The purpose of the interface is to provide a means for directly coupling some phone line connection utilization means 20 to a phone line through leads 22 and 24, whether by way of a modular connector or by other connection techniques. The phone line connecton utilization means 20 may of course be any of a relatively large number of devices, such as, by way of example, modems, i.e., modulator-demodulator sets for digital communication over phone lines. Phone answering machines are but another example of such direct connect equipment.

Lines 22 and 24 for connecting directly to the phone line are coupled to a diode bridge comprised of diodes D1 through D4 with the resistor R1 providing inadvertent short circuit current limiting. The diode bridge provides a fixed polarity on lines 26 and 28, independent of the particular polarity on lines 22 and 24, thereby making the circuit insensitive to the polarity of the phone line connection. In most systems, as in FIG. 1, the switch which simulates the switch which is closed when the phone goes off hook is the relay switch SW1 controlled by the phone line connection utilization means 20 (capacitor C1 is a relatively low valued capacitor used only for switching noise suppression). With the relay switch SW1 closed, lines 26 and 28 are coupled to the primary of isolation transformer TR1 through capacitor C2, the secondary of transformer TR1 of course being coupled through lines 30 and 32 to the utilization means.

One of the key aspects of the present invention interface is the solid state off hook phone line load, the circuit of which is shown within the phantom outline 34. This embodiment of the solid state off hook phone line load is comprised of transistors T1 and T2 coupled as a Darlington pair, with the common collectors being coupled to line 26 and the emitter of transistor T2 being coupled to line 28a through resistor R2. The base of transistor T1 is biased through resistor R3, with capacitor C3 filtering out the AC components (resulting from information on the phone line) between the base of transistor T1 and line 28a.

The combination of resistor R3 and capacitor C3 act as an RC filter so that even though the base of transistor T1 may receive a DC current bias through resistor R3, the AC voltage (caused by information on the telephone line) between the base of transistor T1 and line 28a is greatly suppressed by capacitor C3. In a typical system, a ring detector 36 will detect the AC ring signal on the phone line and provide a signal on line 38 to the utilization means 20. A typical ring detector may include an optoisolator capacitively coupled through lines 40 and 42 to the phone line so as to isolate the DC voltage on the line from the detector but to pass the ring signal for detection, the isolator also providing the required DC isolation from the line, as does transformer TR1 for the signal path. After the ring signal is detected, the relay SW1 will be closed, thereby coupling the phone lines across the solid state off hook phone line load 34. Since the phone lines may have a relatively high DC voltage thereon when the relay is closed, a surge protector 44, e.g. lightning, etc. may be used to limit the maximum voltage impressed across the solid state off hook phone line load so that the breakdown voltage of transistors T1 and T2 need not be inordinately high. In the preferred embodiment, resistor R3 and capacitor C3 have a time constant on the order of 0.7 seconds so that capacitor C3 quickly charges through resistor R3 toward the voltage on line 26. When the voltage on capacitor C3 exceeds the normal operating voltage drop for the base to emitter voltage on transistor T1 plus the base to emitter voltage on transistor T2, transistor T1 and particularly transistor T2 will start to turn on. As the voltage across capacitor C3 continues to increase, the voltage across resistor R2 will also increase, always being lower than the voltage across capacitor C3 by the sum of the base to emitter voltages on the two transistors. In the steadystate, the voltage across capacitor C3 will stop increasing when the voltage drop across resistor R3 is just sufficient to supply the required base current to transistor T1 to maintain the operating points of the two transistors so as to supply the required current through transistor T2 and resistor R2. In the preferred embodiment resistor R2 is actually two 100 ohm resistors giving a total series resistance of 200 ohms, two resistors being used solely for printed circuit board layout and power dissipation considerations.

As the voltage difference between lines 26 and 28a jumps by the closure of relay SW1, capacitor C2 couples a voltage pulse across the primary of transformer TR1 which voltage pulse if not suppressed, will appear between lines 30 and 32 to the phone line connection utilization means. Therefore it is convenient to provide a pair of zener diodes Z1 and Z2 to suppress the spike, the zeners preferably having a relatively low breakdown voltage, though still higher than the amplitude of the information signal which ultimately will appear on lines 30 and 32. The pulse quickly settles however, with capacitor C2 thereafter providing DC isolation for the primary of transformer TR1 while providing strong AC coupling of the information signal which may be on the phone line. The AC information signal is filtered by the RC filter comprised of resistor R3 and capacitor C3 due to the comparatively long time constant thereof so that the voltage between the base of transistor T1 and line 28a is substantially free of the AC signal. Since the base to emitter voltage of an operating transistor is substantially independent of collector voltage, the voltage across the resistor R2 remains equal to the voltage across capacitor C3 minus the two substantially constant base to emitter voltage drops. Thus since the voltage across capacitor C3 is substantially free of the AC signal voltage, the voltage across resistor R2 and hence the current through resistor R2 is also substantially free of AC components. Since the only substantial current in the solid state off hook phone line load is that which flows through resistor R2, the solid state off hook phone line load effectively acts as a constant current load between the phone lines 22 and 24, i.e., as a current load, the magnitude of which is dependent upon the DC voltage across the phone lines, but which is substantially constant independent of the superposition of the informaton carrying AC signal on the line. This in effect means that the apparent DC impedance of the solid state off hook phone line load is relatively low to hold the line connection, though the AC impedance is quite high so as to not significantly attenuate the information signal on the line. In that regard it should be noted that normally resistor R3 will be relatively large (330K in the preferred embodiment). Also the apparent DC impedance of the solid state off hook phone line load will be somewhere in the range of somewhat larger than resistor R2 to a few times larger than resistor R2, depending upon the various parameters involved. (Approximately in the proportion of the DC voltage between line 26 and line 28a divided by the voltage across resistor R2 at the nominal bias point.)

Another way of looking at the solid state off hook phone line load circuit 34 is to recognize that the incremental collector impedance of transistors operating in the active transistor region is quite high. Thus, assuming capacitor C3 provides good AC isolation, the apparent AC impedance of the circuit is substantially equal to the parallel combination of the collector impedance of transistor T1, the collector impedance of transistor T2, and the resistance R3. The value of resistor R3 may be relatively high as the base current required by transistor T1 to hold transistor T2 in saturation is relatively low because of the gain of the transistors. Since collector current in a transistor is relatively independent of collector voltage, the apparent impedance of this solid state off hook phone line load for all frequencies except relatively low frequencies is on the order of the value of resistor R3.

It should be noted the resistor R3 and capacitor C3 provide a low frequency filter means for supplying a control signal to the Darlington pair comprised of transistors T1 and T2. While the RC filter is perhaps the most convenient form to use for this purpose, clearly other low frequency filter means to provide the control signal to the Darlington pair may also be used. As one example, in the embodiment shown in FIG. 1 the solid state off hook phone line load will provide a current between the two phone lines which varies approximately proportional to the voltage between the two lines. On the other hand, a zener diode could be used in place of capacitor C3 to effectively clamp the voltage on the base of transistor T1 to the zener voltage. This would set the voltage across resistor R2 at the zener voltage minus two base-emitter diode drops (from transistors T1 and T2) thereby setting the current flow through resistor R2 substantially independent of AC variations across the phone lines. In fact, such a configuration would provide a current flow which above a given minimum phone line voltage would be substantially independent of further increases in the phone line voltage. This of course, is but one example of an alternate circuit which in essence comprises a low frequency filter means to provide the reference signal to the Darlington pair. In that regard, the Darlington pair, together with resistor R2, may be replaced with any suitable current load means responsive to a control signal to provide a current flow between the two phone lines. Thus, while a preferred embodiment has been shown and described herein and an alternate embodiment has been described, it will be obvious to those skilled in the art that various changes in form and detail may be made in the invention without departing from the spirit and scope thereof.

I claim:

1. A solid state of hook phone line load comprising a diode bridge for coupling between a pair of phone lines to provide a predetermined polarity between a second pair of lines whereby a first line will be positive with respect to a second line, a low frequency filter consisting only of a resistor connected to said first line and a capacitor connected between said resistor and said second line, said low frequency filter being a means for providing a control signal at the junction between said resistor and said capacitor which is responsive to a DC voltage on the phone line, and a first transistor having a collector connected to said first line, a base, and an emitter connected to said second line through a resistive load, said base of said first transistor being coupled to said junction between said resistor and said capacitor through a second transistor also having an emitter, a base and a collector, said emitter of said second transistor being connected to said base of said first transistor, said base of said second transistor being connected to said junction between said resistor and said capacitor, and said collector of said second transistor being connected to said first line, whereby a relatively low impedance is imposed between said first and second lines for DC and very low frequencies and a relatively high impedance is imposed at phone line signaling frequencies.

* * * * *